(12) United States Patent
Ballany

(10) Patent No.: US 11,036,462 B2
(45) Date of Patent: Jun. 15, 2021

(54) SYSTEM AND METHOD FOR REDUCING POWER CONSUMPTION IN AN AUDIO SYSTEM BY DISABLING FILTER ELEMENTS BASED ON SIGNAL LEVEL

(71) Applicant: Maxim Integrated Products, Inc., San Jose, CA (US)

(72) Inventor: Ross Ballany, Edinburgh (GB)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 16/308,758

(22) PCT Filed: Apr. 24, 2018

(86) PCT No.: PCT/US2018/029086
§ 371 (c)(1),
(2) Date: Dec. 10, 2018

(87) PCT Pub. No.: WO2018/200484
PCT Pub. Date: Nov. 1, 2018

(65) Prior Publication Data
US 2019/0146751 A1 May 16, 2019

Related U.S. Application Data

(60) Provisional application No. 62/489,117, filed on Apr. 24, 2017.

(51) Int. Cl.
*G06F 3/16* (2006.01)
*G10L 25/51* (2013.01)
(Continued)

(52) U.S. Cl.
CPC .............. *G06F 3/165* (2013.01); *G06F 1/325* (2013.01); *G06F 3/162* (2013.01); *G10L 25/51* (2013.01); *H04R 3/04* (2013.01); *H04R 29/00* (2013.01)

(58) Field of Classification Search
CPC . G06F 3/16; G06F 3/162; G06F 3/165; G06F 1/325; G06F 1/3287; G06F 1/329;
(Continued)

(56) References Cited

U.S. PATENT DOCUMENTS 3,803,357 A * 4/1974 Sacks ................. H03H 11/0405
381/94.8
4,025,721 A * 5/1977 Graupe ............... G10L 21/0208
704/227
(Continued)

FOREIGN PATENT DOCUMENTS

KR 20060123495 A 12/2006
KR 20130088684 A 8/2013

OTHER PUBLICATIONS

International Search Report and Written Opinion for PCT/US2018/029086, dated Jul. 31, 2018.

*Primary Examiner* — Leshui Zhang
(74) *Attorney, Agent, or Firm* — Kevin E. West; Advent, LLP

(57) ABSTRACT

An audio system includes a digital audio interface, a first filter stage, a second filter stage, a controller, and a first path selector. The controller is communicatively coupled to the digital audio interface and configured to determine whether an audio signal received at the digital audio interface is below a first signal threshold. The controller selects one of a first signal path that passes through the first and second filter stages and a second signal path that bypasses the first filter stage based upon the determination. The first path selector is communicatively coupled to the controller and at least one of the first filter stage and the second filter stage and is configured to generate the selected one of the first and second signal paths.

20 Claims, 9 Drawing Sheets

(51) Int. Cl.
  *H04R 29/00* (2006.01)
  *G06F 1/3234* (2019.01)
  *H04R 3/04* (2006.01)

(58) Field of Classification Search
  CPC ....... G06F 1/3293; G10L 25/51; G10L 25/54;
    G10L 25/60; G10L 25/69; G10L 25/72;
    H04R 3/04; H04R 3/06; H04R 3/08;
    H04R 3/10; H04R 3/12; H04R 29/00;
    H04R 29/001; H04R 29/002; H04R
    29/003; H04R 29/004; H04R 29/005;
    H04R 29/006; H04R 29/007; H04R
    29/008
  USPC ................. 381/56, 57, 58, 60, 61, 312–321,
    381/71.1–71.14, 72, 73.1, 74, 91, 92,
    381/94.1–94.6, 94.8, 94.9, 97–104,
    381/106–108, 111–117, 118, 119, 120,
    381/121, 122, 123; 700/94
  See application file for complete search history.

(56) References Cited

U.S. PATENT DOCUMENTS

| | | | | |
|---|---|---|---|---|
| 4,185,168 A | * | 1/1980 | Graupe | H03G 5/165 |
| | | | | 381/318 |
| 4,454,609 A | * | 6/1984 | Kates | G10L 21/0364 |
| | | | | 381/106 |
| 4,508,940 A | * | 4/1985 | Steeger | H04R 25/505 |
| | | | | 381/317 |
| 2002/0085626 A1 | * | 7/2002 | Starr | H04B 15/02 |
| | | | | 375/149 |
| 2007/0274538 A1 | | 11/2007 | Van Reck | |
| 2009/0066549 A1 | | 3/2009 | Thomsen et al. | |
| 2010/0222904 A1 | | 9/2010 | Yamashita et al. | |
| 2012/0046772 A1 | | 2/2012 | Dickins | |
| 2012/0140942 A1 | * | 6/2012 | Loeda | G10K 11/178 |
| | | | | 381/71.11 |
| 2013/0194497 A1 | | 8/2013 | Kim et al. | |

\* cited by examiner

SYSTEM AND METHOD FOR REDUCING POWER CONSUMPTION IN AN AUDIO SYSTEM BY DISABLING FILTER ELEMENTS BASED ON SIGNAL LEVEL

BACKGROUND

Audio systems often include an expander. The expander (sometimes called a "squelch" circuit) is typically used to expand the dynamic range of an audio system by attenuating relatively low level audio signals when the audio signals falls below a particular signal amplitude threshold or signal power level threshold. The attenuation of the low level audio signals generally reduces the noise level in audio systems.

A 2s complement numbering scheme is widely used in the implementation of digital signal processing (DSP) filters in audio systems. A 2s complement number is formed by taking a binary representation of a decimal number, inverting the bits, and then adding a "1" to the number. The use of the 2s complement numbering scheme in DSP filters may cause an audio signal with a least significant bit (LSB) that toggles between 1 LSB and −1 LSB to switch all the bits (e.g., from 1 to 0 or 0 to 1) in a digital word representation of the audio signal. The switching of the bits can result in increased power consumption as the audio signal is digitally filtered. As a result, the processing of relatively low level audio signals using DSP filters typically does not result in reduced power consumption when compared to the processing of relatively higher level audio signals.

Other audio signal processing systems often employ nonstandard arithmetic schemes to alter filter coefficients dynamically thereby reducing the number of operations being performed in an attempt to reduce the power consumption associated with the processing of audio signals. Nonstandard arithmetic schemes are based on predetermined rules for controlling the filter coefficients. As such, the use of nonstandard arithmetic schemes may create challenges when it comes to the designing of programmable filters in accordance with customer specifications and requirements.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
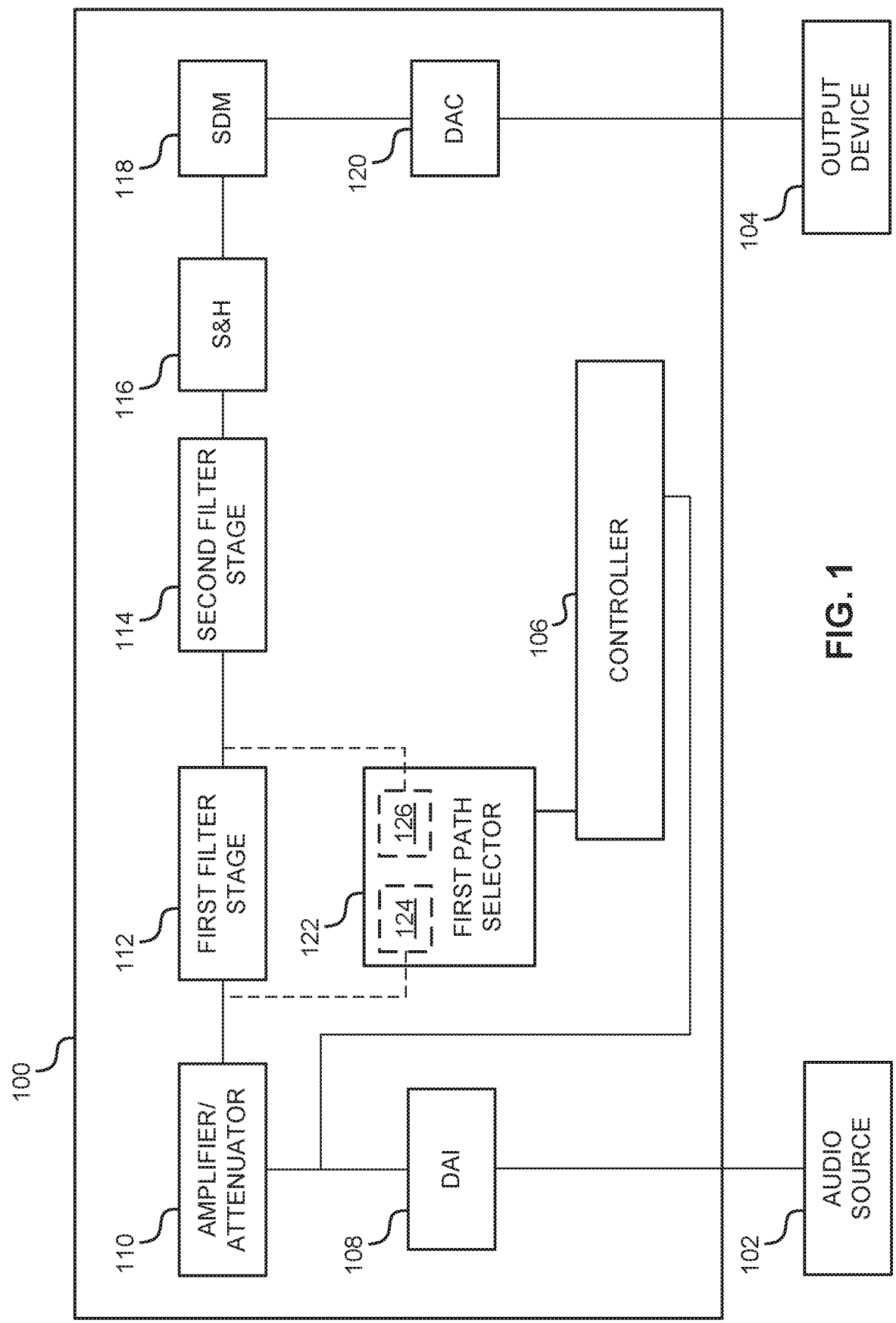
FIG. 1 is a block diagram representation of an embodiment of an audio system configured to selectively bypass a first filter stage.

An digital signal processing path for an audio signal in a digital-to-analog converter (DAC) in an audio system often includes multiple different filter stages. The different filter stages may be used to raise the sample rate of the audio signal as the audio signal traverses a signal path within the audio system that accommodates the DAC component (e.g., by a factor of 128× or more). The different filter stages may be configured to customize the digital filtering to an audio signal. Examples of characteristics of an audio signal that may be considered in customizing the digital filtering include, but are not limited to, passband ripple (e.g., a measure of the flatness of the filter response from 20 Hz to 20 kHz—in some implementations, this may be +/−0.1 dB or less) and stopband attenuation (e.g., the amount of attenuation applied to images produced by the upsampling process—in some implementations, this may be 75 dB or more).

A 2s complement numbering scheme is widely used in the implementation of digital signal processing (DSP) filters in audio systems. A 2s complement number is formed by taking a binary representation of a decimal number, inverting the bits, and then adding a "1" to the number. The use of the 2s complement numbering scheme in DSP filters may cause an audio signal with a least significant bit (LSB) that toggles between 1 LSB and −1 LSB to switch all the bits (e.g., from 1 to 0 or 0 to 1) in a digital word representation of the audio signal. The switching of the bits can result in increased power consumption as the audio signal is digitally filtered. As a result, the processing of relatively low level audio signals using DSP filters typically does not result in reduced power consumption when compared to the processing of relatively higher level audio signals.

An expander (sometimes called a "squelch" circuit) can be used to expand the dynamic range of an audio system. For example, when a 16-bit input signal is used, the audio system may be limited to a 98 dB dynamic range (e.g., N×6.02+1.76, where N is the number of bits available) or less. The expander monitors the audio signal and when the audio signal falls below specific signal thresholds (e.g., a programmable or otherwise configurable threshold signal), the expander reduces the gain of the system so that a noise level associated with the audio signal is reduced as the audio signal is attenuated to a level that is relatively lower than a theoretical minimum level associated with the audio signal thereby expanding the dynamic range of the audio system. Attenuating the audio signal level may not result in reduced power consumption by the audio system. For example, when infinite impulse response (IIR) filters are used, the feedback in the IIR filters, may cause internal nodes to toggle at a low level even if an input audio signal goes to digital zero. In some cases, the IIR filters can use 25 to 40 percent (%) of the total digital core power.

Systems and methods are disclosed that may reduce power consumption in an audio system by selectively bypassing one or more filter stages and accepting relatively lower quality signal processing when an audio signal (e.g., signal amplitude) falls below a signal threshold. Applying all of the available filters in an audio system to relatively lower level audio signals may provide little to no audible benefit to a user. In other words, the application of all of the filters in an audio system may result in an improvement to an audio signal that may be so slight that an average listener may be unable to perceive a difference. The bypassing of one or more filter stages in an audio system may reduce power consumption without significant (or nearly without) loss of audible audio signal quality.

In accordance with implementations of this disclosure, a method for processing an audio signal includes, receiving an audio signal at a digital audio interface, attenuating the received audio signal to reduce the gain value of the signal when the signal level of the signal is below a first signal threshold, and bypassing at least a first filter stage (e.g., filters in a DSP core) when the audio signal is below the first signal threshold. The method can further include bypassing additional filter stages. For example, the method can include bypassing a second filter stage when the audio signal is below a second signal threshold. In some implementations, the method can include tiered signal processing. For example, the first filter stage can be bypassed when the audio signal is below the first signal threshold, and the second filter stage can be bypassed when the audio signal is below a second signal threshold, wherein the second threshold is lower than the first signal threshold. This methodology can be extended to bypass additional filter stages by comparing the audio signal to additional signal thresholds (e.g., at the first, second, or possible a third threshold level or others), or to bypass a sample-and-hold block and/or sigma-delta modulator prior to feeding the audio signal to a digital-to-analog converter that is communicatively coupled to an output device (e.g., loudspeaker, audio transmitter, etc.).

Referring to FIG. 1, a block diagram representation of an embodiment of an audio system 100 configured to selectively bypass a first filter stage 112 is shown. In an embodiment, the audio system 100 is configured to be communicatively coupled to an audio source 102. The audio system 100 is configured to be communicatively coupled to the audio source 102 via one of a wired communication channel, a wireless communication channel and a combination of a wired and wireless communication channel. Examples an audio sources 102 includes, but are not limited to, a mobile device, an audio receiver, a television, and a personal computer. Examples of mobile devices include, but are not limited to, a smartphone, a tablet, a smartwatch, an activity tracker, a digital camera, a notebook computer, a portable media player, a portable gaming device, and a portable storage device. In an alternative embodiment, the audio system 100 may be integrated with or a component of an audio source 102.

In an embodiment, the audio system 100 is configured to be communicatively coupled to an output device 104. The audio system 100 is configured to be communicatively coupled to the output device 104 via one of a wired communication channel, a wireless communication channel and a combination of a wired and wireless communication channel. Examples of output devices 104 include, but are not limited to, a loudspeaker and an audio transmitter. In an alternative embodiment, the audio system 100 maybe integrated with or a component of an output device 104. In another embodiment, the audio system 100 may be integrated with both an audio source 102 and an output device 104.

An embodiment of the audio system 100 includes a controller 106, a digital audio interface (DAI) 108, an amplifier/attenuator 110, a first filter stage 112, a second filter stage 114, a sample-and-hold (S&H) circuit 116, a sigma-delta modulator (SDM) 118, a digital-to-analog converter (DAC) 120, and a first path selector 122. The audio system 100 may include additional components that are not shown in FIG. 1. The audio system 100 may include fewer components than those illustrated in FIG. 1.

In an embodiment, DAI 108 is communicatively coupled to the audio source 102. In an alternative embodiment, the DAI 108 is configured to be communicatively coupled to the audio source 102. Examples of DAIs 108 include, but are not limited to, an audio input jack/pin, a wireless receiver/transceiver, a magnetic receiver, an optical receiver, a read head, or any combination thereof. The DAI 108 is configured to receive an audio signal from the audio source 102. The audio signal received from the audio source 102 is a digital audio signal.

The controller 106 is communicatively coupled to the DAI 108 and the amplifier/attenuator 110. The controller 106 receives an audio signal received at the audio system 100 via the DAI 108 and compares the received audio signal with a first signal threshold to determine whether the audio signal falls below the first signal threshold. If the controller 106 determines that the audio signal falls below the first signal threshold, the controller 106 identifies a first attenuation factor associated with audio signals that fall below the first signal threshold. The controller 106 manages the operation of the amplifier/attenuator 110 to implement an attenuation of the received audio signal in accordance with the identified first attenuation factor. In an embodiment, the controller 106 is an expander. In an embodiment, the first signal threshold is a predefined signal threshold. In an embodiment, the first attenuation factor is a predefined attenuation factor. In an embodiment, the first signal threshold is a signal amplitude threshold and the controller 106 compares the amplitude of the received audio signal with the first signal threshold. In an embodiment, the first signal threshold is a signal power threshold and the controller 106 compares the power of the received audio signal with the first signal threshold.

The controller 106 is communicatively coupled to the first filter stage 112 via a first path selector 122. The first filter stage 112 is configured to be communicatively coupled in series with the amplifier/attenuator 110 and the second filter stage 114. The second filter 114 is communicatively coupled in series with the S&H circuit 116. The S&H circuit 116 is communicatively coupled in series with the SDM 118. The SDM 118 is communicatively coupled to the DAC 120. The DAC is configured to be communicatively coupled to the output device 104.

In an embodiment, the first path selector 122 comprises a control switch 124 and a first multiplexer 126. As mentioned above, the controller 106 compares the audio signal received at the DAI 108 with a first signal threshold. If the controller 106 determines that the audio signal does not fall below the first signal threshold, the controller 106 manages the control switch 124 and the first multiplexer 126 to generate a first signal path such that the audio signal generated by the amplifier/attenuator 110 passes through and is processed by the first filter stage 112, the second filter stage 114, the S&H circuit 116, the SDM 118, and the DAC 120. If the controller 106 determines that the audio signal falls below the first signal threshold, the controller 106 manages the control switch 124 and the first multiplexer 126 to generates a second signal path such that an audio signal generated by the amplifier/attenuator 110 bypasses first filter stage 112. The audio signal generated by the amplifier/attenuator 110 passes through and is processed by the second filter stage 114 the S&H circuit 116, the SDM 118, and the DAC 120. The DAC 120 generates an analog version of the audio signal received at the DAI 108 for transmission to the output device 104. Bypassing the first filter stage 112 typically results in reduced power consumption by the audio system 100.

In an alternative embodiment, the first path selector 122 comprises a first multiplexer 126. If the controller 106 determines that the audio signal does not fall below the first signal threshold, the controller 106 manages the first multiplexer 126 to generate a first signal path such that the audio signal generated by the amplifier/attenuator 110 passes through and is processed by the first filter stage 112, the second filter stage 114, the S&H circuit 116, the SDM 118, and the DAC 120. If the controller 106 determines that the audio signal falls below the first signal threshold, the controller 106 manages the first multiplexer 126 to generates a second signal path such that an audio signal generated by the amplifier/attenuator 110 bypasses first filter stage 112. The audio signal generated by the amplifier/attenuator 110 passes through and is processed by the second filter stage 114 the S&H circuit 116, the SDM 118, and the DAC 120. The DAC 120 generates an analog version of the audio signal received at the DAI 108 for transmission to the output device 104. In an embodiment, the signal threshold used to determine the attenuation factor may be different from the threshold used to determine the signal path for the audio signal through the audio system 100.

In an embodiment, the first filter stage 112 includes a plurality of digital signal processing (DSP) core filters. In an embodiment, the first filter stage 112 includes three DSP core filters. The first filter stage 112 may, however, include a greater or few number of DSP core filters. An example of a DSP core filter is an infinite impulse response (IIR) filter. The second filter stage 114 includes a cascaded integrator-comb (CIC) filter. In an embodiment, the second filter stage 114 includes a first-in-first out (FIFO) block communicatively coupled to the CIC filter such that an audio signal received for processing at the second filter stage 114 is received at the FIFO prior to processing by the CIC filter.

In an alternative embodiment, the first filter stage 112 includes a cascaded integrator-comb (CIC) filter. In an embodiment, the first filter stage 112 includes a first-in-first out (FIFO) block communicatively coupled to the CIC filter such that an audio signal received for processing at the first filter stage 112 is received at the FIFO prior to processing by the CIC filter. The second filter stage 114 includes a plurality of digital signal processing (DSP) core filters. In an embodiment, the second filter stage 114 includes three DSP core filters. The second filter stage 114 may, however, include a greater or few number of DSP core filters.

The audio system 100 includes a clock signal generator (not shown). The clock signal generator is communicatively coupled to the controller 106, first filter stage 112, second filter stage 114, and/or other blocks/components of the audio system 100. The clock signal generator is configured to generate a timing signal that can be adjusted by the controller 106 to synchronize the operation of the different components of the audio system 100 under different operating conditions. For example, the components of the audio system 100 can by synchronized to a specific timing signal provided by the clock signal generator when the signal path includes the first filter stage 112. When the signal path is reconfigured to bypass the first filter stage 112, the clock division(s) associated with the timing signal can be adjusted by the controller 106 to achieve processing rates for the different components of the audio system 100 to accommodate the alternation in the signal path from the first signal path to the second signal path.

Figure 2:
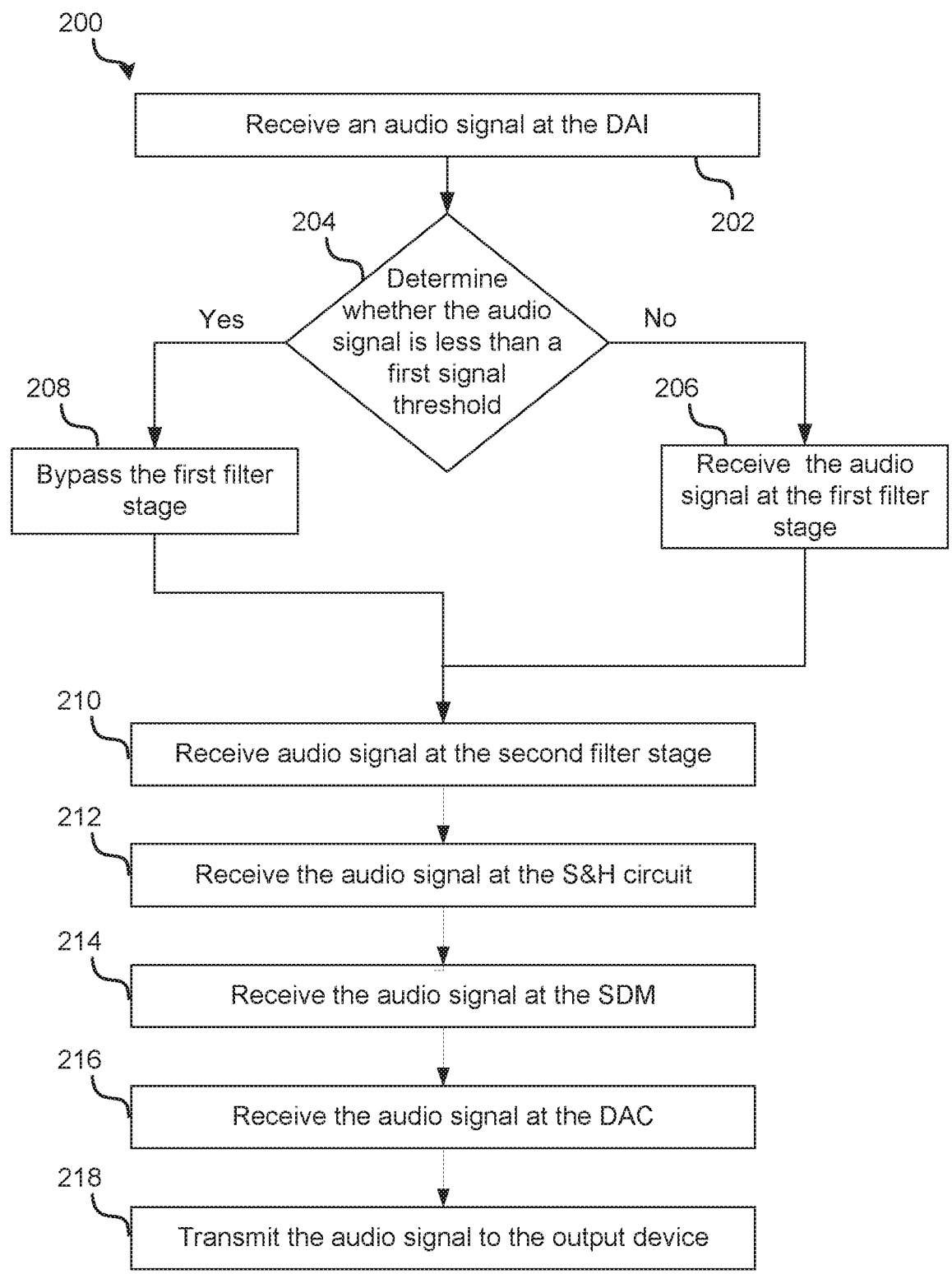
FIG. 2 is a flow diagram representation of an example of a method of selectively bypassing a first filter stage in an embodiment of an audio system.

Referring to FIG. 2, a flow diagram representation of an example of a method 200 of selectively bypassing a first filter stage 112 in an embodiment of an audio system 100 is shown. At 202, an audio signal is received at the DAI 108. The received audio signal is a digital audio signal. The controller 106 determines whether the audio signal received at the DAI 108 is less than a first signal threshold at 204. In an embodiment, the first signal threshold is a signal amplitude threshold. In an embodiment, the first signal threshold is a signal power threshold. In an embodiment, the first signal threshold is a predefined signal threshold. In an embodiment, the first signal threshold may be a dynamic signal threshold that is varies based on one or more operating parameters associated with the audio system 100 and/or factors that may impact the noise present in the received audio signal.

If the controller 106 determines that the audio signal is not less than the first signal threshold, the controller 106 generates a first signal path where the audio signal output by the amplifier/attenuator 110 is received at the first filter stage 112 for processing at 206. Following the processing of the audio signal by the first filter stage 112, the audio signal proceeds to the second filter stage 114.

If the controller 106 determines that the audio signal is less than the first signal threshold, the controller 106 determines a first attenuation factor associated with audio signals that fall below the first signal threshold. The controller 106 manages the operation of the amplifier/attenuator 110 to implement the attenuation of the received audio signal in accordance with the determined first attenuation factor. The attenuation of an audio signal that falls below the first signal threshold may decrease artifacts in the audio signal. The controller 106 generates a second signal path where the audio signal output by the amplifier/attenuator 110 bypasses the first filter stage 112 at 208 and proceeds to the second filter stage 114. In an embodiment, the bypassed first filter stage 112 is disabled. In an embodiment, the bypassed first filter stage 112 is turned off. In an embodiment, the bypassed first filter stage 112 is deactivated. The controller 106 may reconfigure the clock signal generator to adjust the clocks signals generated by the clock signal generator to accommodate the processing of the audio signal via the second signal path.

The audio signal is received at the second filter stage 114 for processing at 210. Following the processing of the audio signal by the second filter stage 114, the signal is received at the S&H circuit 116 at 212. The audio signal is then proceeds from the S&H circuit 116 to the SDM 118. The audio signal is received at the SDM 118 at 214. Following the processing of the audio signal by the SDM 118, the audio signal is received at the DAC 120 for processing at 216. The DAC 120 transmits the analog representation of the audio signal to the output device 104 at 218.

The steps described with respect to method 200 may be performed in a different order. The method 200 may include additional steps or fewer steps than those described above. The implementation of the method 200 enables the controller 106 to drop a potentially power-hungry first filter stage 112 while maintaining the operation of the remainder of the audio system 100 thereby reducing power consumption by the audio system 100.

Figure 3:
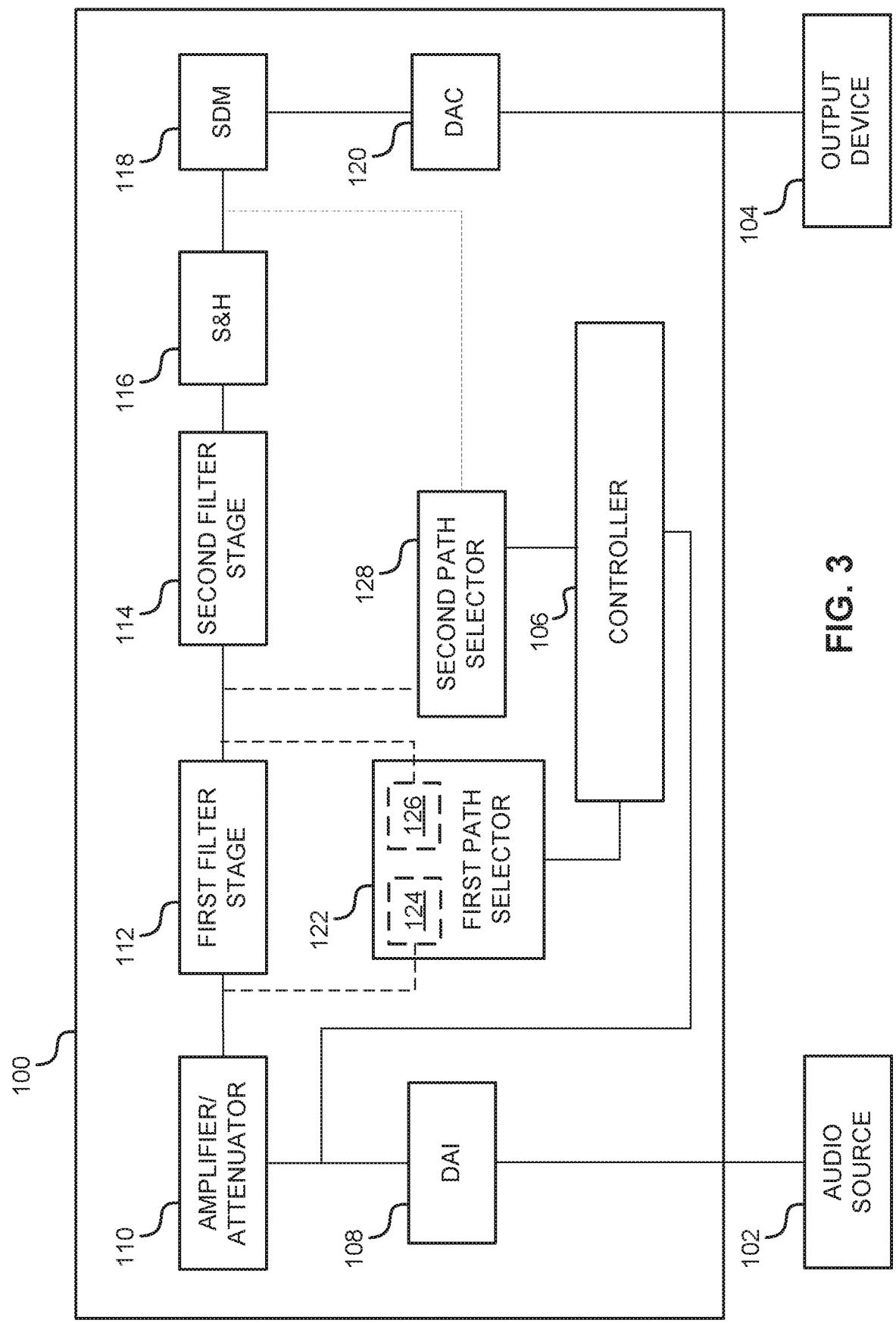
FIG. 3 is a block diagram representation of an embodiment of an audio system configured to selectively bypass first and second filter stages.

Referring to FIG. 3 a block diagram representation of an embodiment of an audio system configured to selectively bypass first and second filter stages is shown. An embodiment of the audio system 100 includes a controller 106, a digital audio interface (DAI) 108, an amplifier/attenuator 110, a first filter stage 112, a second filter stage 114, a sample-and-hold (S&H) circuit 116, a sigma-delta modulator (SDM) 118, a digital-to-analog converter (DAC) 120, a first path selector 122 and a second path selector 128. The audio system 100 may include additional components that are not shown in FIG. 3. The audio system 100 may include fewer components than those illustrated in FIG. 3.

The controller 106 is communicatively coupled to the DAI 108 and the amplifier/attenuator 110. The controller 106 receives an audio signal received at the audio system 100 via the DAI 108 and compares the received audio signal with a first signal threshold to determine whether the audio signal falls below the first signal threshold. If the controller 106 determines that the audio signal falls below the first signal threshold, the controller 106 compares the received audio signal with a second signal threshold, where the second signal threshold is lower than the first signal threshold.

If the controller 106 determines that the audio signal falls below the first signal threshold but not below the second signal threshold, the controller 106 identifies a first attenuation factor associated with audio signals that fall below the first signal threshold but not below the second signal threshold. The controller 106 manages the operation of the amplifier/attenuator 110 to implement an attenuation of the received audio signal in accordance with the identified first attenuation factor.

If the controller 106 determines that the audio signal falls below the second signal threshold, the controller 106 identifies a second attenuation factor associated with audio signals that fall below the second signal threshold. The controller 106 manages the operation of the amplifier/attenuator 110 to implement an attenuation of the received audio signal in accordance with the identified second attenuation factor.

The controller 106 is communicatively coupled to the first filter stage 112 via a first path selector 122 and to the second filter stage 114 via the second path selector 128. The first filter stage 112 is configured to be communicatively coupled in series with the amplifier/attenuator 110 and the second filter stage 114. The second filter 114 is communicatively coupled in series with the S&H circuit 116. The S&H circuit 116 is communicatively coupled in series with the SDM 118. The SDM 118 is communicatively coupled to the DAC 120. The DAC is configured to be communicatively coupled to the output device 104.

In an embodiment, the first path selector 122 comprises a control switch 124 and a first multiplexer 126. In an embodiment, the second path selector 128 comprises a second multiplexer. As mentioned above, the controller 106 compares the audio signal received at the DAI 108 with a first signal threshold and a second signal threshold. If the controller 106 determines that the audio signal does not fall below the first signal threshold, the controller 106 manages the control switch 124, the first multiplexer 126 and the second path selector 128 (second multiplexer) to generate a first signal path such that the audio signal generated by the amplifier/attenuator 110 passes through and is processed by the first filter stage 112, the second filter stage 114, the S&H circuit 116, the SDM 118, and the DAC 120.

If the controller 106 determines that the audio signal falls below the first signal threshold, but not below the second threshold, the controller 106 manages the control switch 124, the first multiplexer 126 and the second path selector 128 (second multiplexer) to generates a second signal path such that an audio signal generated by the amplifier/attenuator 110 bypasses first filter stage 112. The audio signal generated by the amplifier/attenuator 110 passes through and is processed by the second filter stage 114 the S&H circuit 116, the SDM 118, and the DAC 120.

If the controller 106 determines that the audio signal falls below the second signal threshold, the controller 106 manages the control switch 124, the first multiplexer 126, and the second path selector 128 (second multiplexer) to generate a third signal path such that an audio signal generated by the amplifier/attenuator 110 bypasses first filter stage 112, the second filter stage 114 and the S&H circuit 116. The audio signal generated by the amplifier/attenuator 110 passes through and is processed by the SDM 118, and the DAC 120.

In an embodiment, the first path selector 122 comprises a first multiplexer 126 and the second path selector 128 comprises a second multiplexer. If the controller 106 determines that the audio signal does not fall below the first signal threshold, the controller 106 manages the first multiplexer 126 and the second path selector 128 (second multiplexer) to generate a first signal path such that the audio signal generated by the amplifier/attenuator 110 passes through and is processed by the first filter stage 112, the second filter stage 114, the S&H circuit 116, the SDM 118, and the DAC 120.

If the controller 106 determines that the audio signal falls below the first signal threshold, but not below the second threshold, the controller 106 manages the first multiplexer 126 and the second path selector 128 (second multiplexer) to generates a second signal path such that an audio signal generated by the amplifier/attenuator 110 bypasses first filter stage 112. The audio signal generated by the amplifier/attenuator 110 passes through and is processed by the second filter stage 114 the S&H circuit 116, the SDM 118, and the DAC 120.

If the controller 106 determines that the audio signal falls below the second signal threshold, the controller 106 manages the first multiplexer 126, and the second path selector 128 (second multiplexer) to generate a third signal path such that an audio signal generated by the amplifier/attenuator 110 bypasses first filter stage 112, the second filter stage 114 and the S&H circuit 116. The audio signal generated by the amplifier/attenuator 110 passes through and is processed by the SDM 118, and the DAC 120. In an embodiment, the thresholds used to determine the attenuation factors may be different from the thresholds used to determine the first, second and third signal paths for the audio signal through the audio system 100.

The audio system 100 includes a clock signal generator (not shown). The clock signal generator is communicatively coupled to the controller 106, first filter stage 112, second filter stage 114, and/or other blocks/components of the audio system 100. The clock signal generator is configured to generate a timing signal that can be adjusted by the controller 106 to synchronize the operation of the different components of the audio system 100 under different operating conditions. For example, the components of the audio system 100 can by synchronized to a specific timing signal provided by the clock signal generator when the signal path includes the first filter stage 112. When the signal path is reconfigured to bypass the first filter stage 112 or the first and second filter stages 112, 114, the clock division(s) associated with the timing signal can be adjusted by the controller 106 to achieve processing rates for the different components of the audio system 100 to accommodate the alternations in the signal path from.

Figure 4:
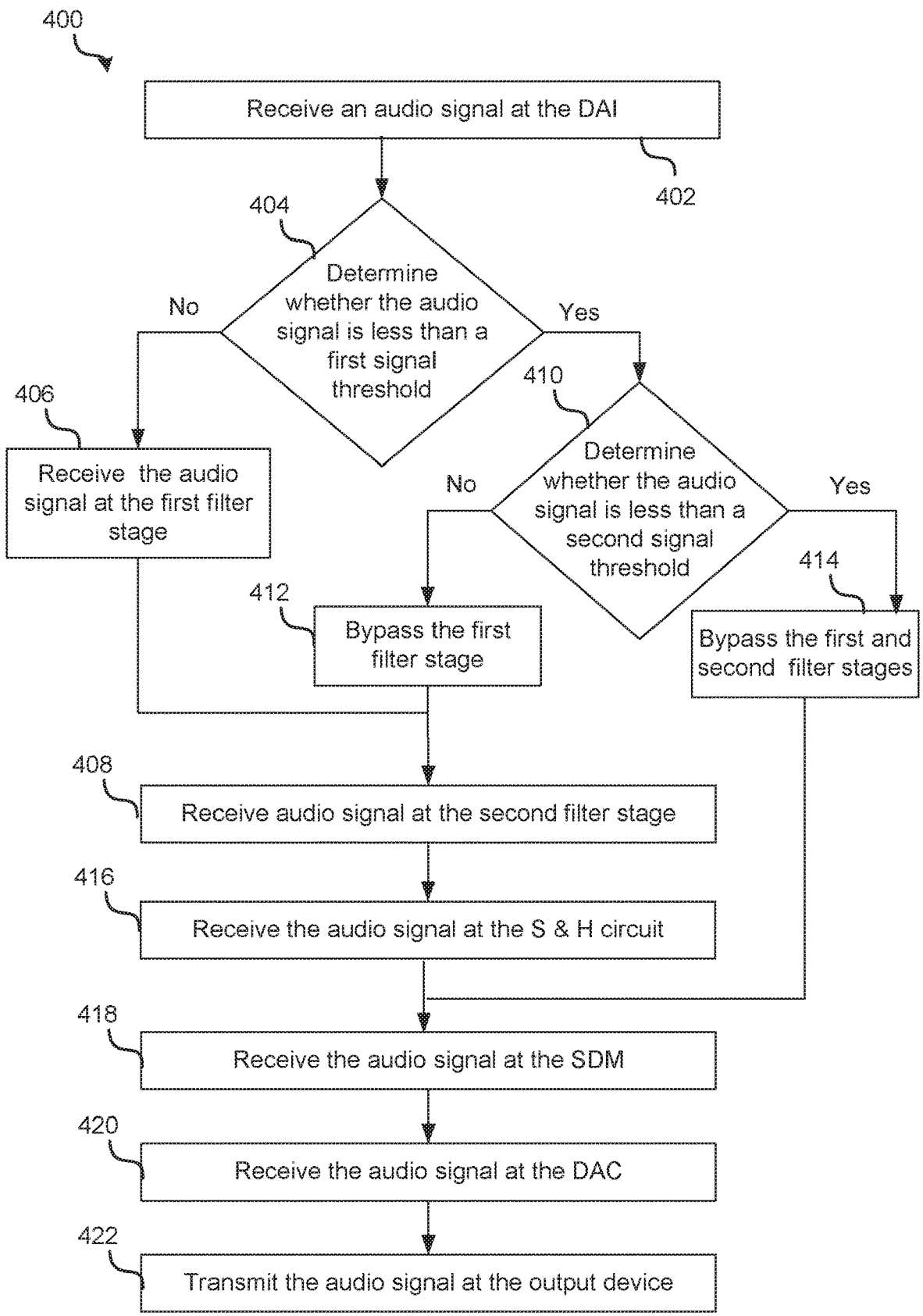
FIG. 4 is a flow diagram representation of an example of a method of selectively bypassing first and second filter stages in an embodiment of an audio system.

Referring to FIG. 4 is a flow diagram representation of an example of a method 400 of selectively bypassing first and second filter stages in an embodiment of an audio system is shown. At 402, an audio signal is received at the DAI 108. The received audio signal is a digital audio signal. The controller 106 determines whether the audio signal received at the DAI 108 is less than a first signal threshold at 404. In an embodiment, the first signal threshold is a signal amplitude threshold. In an embodiment, the first signal threshold is a signal power threshold. In an embodiment, the first signal threshold is a predefined signal threshold. In an embodiment, the first signal threshold may be a dynamic signal threshold that is varies based on one or more operating parameters associated with the audio system 100 and/or factors that may impact the noise present in the received audio signal.

If the controller 106 determines that the audio signal is not less than the first signal threshold, the controller 106 generates a first signal path where the audio signal output by the amplifier/attenuator 110 is received at the first filter stage 112 for processing at 406. Following the processing of the audio signal by the first filter stage 112, the audio signal proceeds to the second filter stage 114 and the audio signal is received at the second filter stage 114 at 408. Following the processing of the audio signal by the second filter stage 114, the audio signal is received at the S&H circuit 116 at 416. The audio signal is the received from the S&H circuit at the SDM 118 for processing at 418. The audio signal is received at the DAC 120 from the SDM 118 for processing at 420 and then transmitted from the DAC 120 to the output device 104 at 422.

If the controller 106 determines that the audio signal is less than the first signal threshold at 404, the controller 106 determines whether the audio signal is less than the second signal threshold at 410. If the controller 106 determines that the audio signal is not less than the second signal threshold, the controller 106 determines a first attenuation factor associated with audio signals that fall below the first signal threshold but not below the second signal threshold. The controller 106 manages the operation of the amplifier/attenuator 110 to implement the attenuation of the received audio signal in accordance with the determined first attenuation factor.

The controller 106 generates a second signal path where the audio signal output by the amplifier/attenuator 110 bypasses the first filter stage 112 at 412 and proceeds to the second filter stage 114 and the audio signal is received at the second filter stage at 408. Following the processing of the audio signal by the second filter stage 114, the audio signal is received at the S&H circuit 116 at 416. The audio signal is the received from the S&H circuit at the SDM 118 for processing at 418. The audio signal is received at the DAC 120 from the SDM 118 for processing at 420 and then transmitted from the DAC 120 to the output device 104 at 422.

In an embodiment, the bypassed first filter stage 112 is disabled. In an embodiment, the bypassed first filter stage 112 is turned off. In an embodiment, the bypassed first filter stage 112 is deactivated. The controller 106 may reconfigure the clock signal generator to adjust the clocks signals generated by the clock signal generator to accommodate the processing of the audio signal via the second signal path.

If the controller 106 determines that the audio signal is less than the second signal threshold at 410, the controller 106 determines a second attenuation factor associated with audio signals that fall below the second signal threshold. The controller 106 manages the operation of the amplifier/attenuator 110 to implement the attenuation of the received audio signal in accordance with the determined second attenuation factor. The controller 106 generates a third signal path where the audio signal output by the amplifier/attenuator 110 bypasses the first filter stage 112 and the second filter stage 114 at 414. The audio signal also bypasses the S&H circuit and is received at the SDM 118 for processing at 418. The audio signal is received at the DAC 120 from the SDM 118 for processing at 420 and then transmitted from the DAC 120 to the output device 104 at 422.

In an embodiment, the bypassed second filter stage 114 is disabled. In an embodiment, the bypassed second filter stage 114 is turned off. In an embodiment, the bypassed second filter stage 114 is deactivated. The controller 106 may reconfigure the clock signal generator to adjust the clocks signals generated by the clock signal generator to accommodate the processing of the audio signal via the third signal path.

The steps described with respect to method 400 may be performed in a different order. The method 400 may include additional steps or fewer steps than those described above. The implementation of the method 400 enables the controller 106 to drop the first filter stage 112 and the second filter stage 114 while maintaining the operation of the remainder of the audio system 100 thereby reducing power consumption by the audio system 100.

Figure 5:
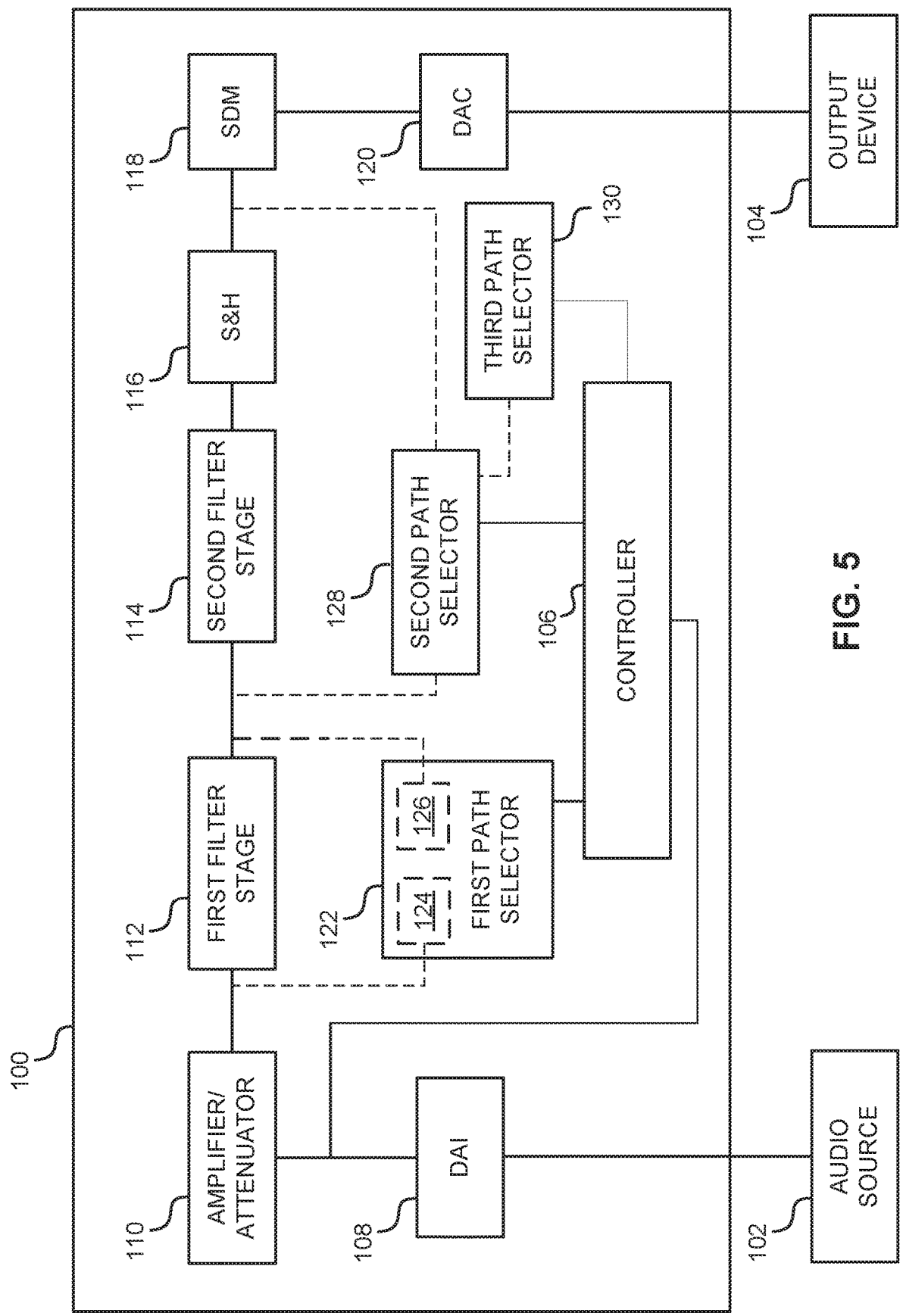
FIG. 5 is a block diagram representation of an embodiment of an audio system configured to selectively bypass a first filter stage, a second filter stage, and a sigma-delta modulator.
Figure 9:
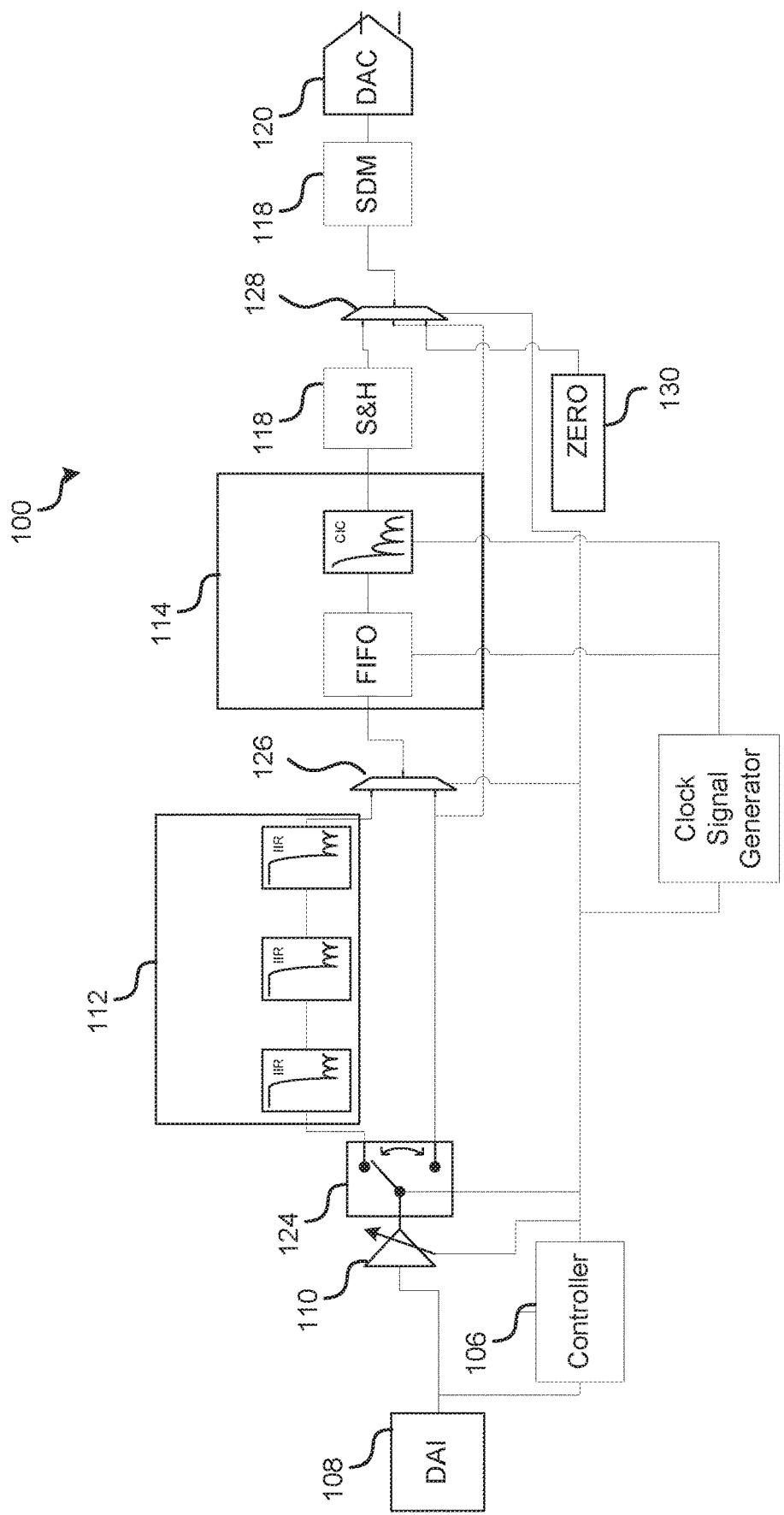
FIG. 9 is a schematic representation of an embodiment of the audio system of FIG. 5.

Referring to FIG. 5 a block diagram representation of an embodiment of an audio system configured to selectively bypass a first filter stage, a second filter stage, and a sigma-delta modulator is shown. FIG. 9 is a schematic representation of an embodiment of the audio system of illustrated in FIG. 5. An embodiment of the audio system 100 includes a controller 106, a digital audio interface (DAI) 108, an amplifier/attenuator 110, a first filter stage 112, a second filter stage 114, a sample-and-hold (S&H) circuit 116, a sigma-delta modulator (SDM) 118, a digital-to-analog converter (DAC) 120, a first path selector 122, a second path selector 128 and a third path selector 130. The audio system 100 may include additional components that are not shown in FIG. 5. The audio system 100 may include fewer components than those illustrated in FIG. 5

The controller 106 is communicatively coupled to the DAI 108 and the amplifier/attenuator 110. The controller 106 receives an audio signal received at the audio system 100 via the DAI 108 and compares the received audio signal with a first signal threshold to determine whether the audio signal falls below the first signal threshold. If the controller 106 determines that the audio signal falls below the first signal threshold, the controller 106 compares the received audio signal with a second signal threshold, where the second signal threshold is lower than the first signal threshold. If the controller 106 determines that the audio signal falls below the second signal threshold, the controller 106 compares the received audio signal with a third signal threshold, where the third signal threshold is lower than the second signal threshold.

If the controller 106 determines that the audio signal falls below the first signal threshold but not below the second signal threshold, the controller 106 identifies a first attenuation factor associated with audio signals that fall below the first signal threshold but not below the second signal threshold. The controller 106 manages the operation of the amplifier/attenuator 110 to implement an attenuation of the received audio signal in accordance with the identified first attenuation factor.

If the controller 106 determines that the audio signal falls below the second signal threshold but not below the third signal threshold, the controller 106 identifies a second attenuation factor associated with audio signals that fall below the second signal threshold but not below the third signal threshold. The controller 106 manages the operation of the amplifier/attenuator 110 to implement an attenuation of the received audio signal in accordance with the identified second attenuation factor.

If the controller 106 determines that the audio signal falls below the third signal threshold, the controller 106 identifies a third attenuation factor associated with audio signals that fall below the third signal threshold. The controller 106 manages the operation of the amplifier/attenuator 110 to implement an attenuation of the received audio signal in accordance with the identified third attenuation factor.

The controller 106 is communicatively coupled to the first filter stage 112 via a first path selector 122 and to the second filter stage 114 via the second path selector 128. In an embodiment, the controller 106 is communicatively coupled to the SDM 118 via the second path selector 128 and the third path selector 130. In an embodiment the third path selector 130 is configured to supply a "zero" data to an input of the second path selector 128 (e.g. second multiplexer).

The first filter stage 112 is configured to be communicatively coupled in series with the amplifier/attenuator 110 and the second filter stage 114. The second filter 114 is communicatively coupled in series with the S&H circuit 116. The S&H circuit 116 is configured to be communicatively coupled in series with the SDM 118. The SDM 118 is configured to be communicatively coupled to the DAC 120. The DAC is configured to be communicatively coupled to the output device 104.

In an embodiment, the first path selector 122 comprises a control switch 124 and a first multiplexer 126. In an embodiment, the second path selector 128 comprises a second multiplexer. In an embodiment, the third path selector 130 is configured to provide "zero" data to an input of the second path selector (e.g. second multiplexer). As mentioned above, the controller 106 compares the audio signal received at the DAI 108 with a first signal threshold, a second signal threshold, and a third signal threshold. If the controller 106 determines that the audio signal does not fall below the first signal threshold, the controller 106 manages the control switch 124, the first multiplexer 126, the second path selector 128 (e.g. second multiplexer), and the third path selector 130 to generate a first signal path such that the audio signal generated by the amplifier/attenuator 110 passes through and is processed by the first filter stage 112, the second filter stage 114, the S&H circuit 116, the SDM 118, and the DAC 120.

If the controller 106 determines that the audio signal falls below the first signal threshold, but not below the second signal threshold, the controller 106 manages the control switch 124, the first multiplexer 126, the second path selector 128 (e.g. second multiplexer) and the third path selector 130 to generates a second signal path such that an audio signal generated by the amplifier/attenuator 110 bypasses first filter stage 112. The audio signal generated by the amplifier/attenuator 110 passes through and is processed by the second filter stage 114 the S&H circuit 116, the SDM 118, and the DAC 120.

If the controller 106 determines that the audio signal falls below the second signal threshold, but not below the third signal threshold, the controller 106 manages the control switch 124, the first multiplexer 126, the second path selector 128 (e.g. second multiplexer), and the third path selector 130 to generate a third signal path such that an audio signal generated by the amplifier/attenuator 110 bypasses first filter stage 112, the second filter stage 114 and the S&H circuit 116. The audio signal generated by the amplifier/attenuator 110 passes through and is processed by the SDM 118, and the DAC 120.

If the controller 106 determines that the audio signal falls below the third signal threshold, the controller 106 manages the control switch 124, the first multiplexer 126, the second path selector 128 (e.g. second multiplexer), and the third path selector 130 to generate a fourth signal path such that an audio signal generated by the amplifier/attenuator 110 bypasses first filter stage 112, the second filter stage 114, the S&H circuit 116 and the SDM 118. In an embodiment, the controller 106 enables the "zero" data input supplied by the third path selector 130 to an input of the second path selector 128 (e.g. second multiplexer) to generate the fourth signal path. The audio signal generated by the amplifier/attenuator 110 passes through and is processed by the DAC 120.

In an embodiment, the first path selector 122 comprises a first multiplexer 126. In an embodiment, the second path selector 128 comprises a second multiplexer. In an embodiment, the third path selector 130 is configured to provide "zero" data to an input of the second path selector (second multiplexer). As mentioned above, the controller 106 compares the audio signal received at the DAI 108 with a first signal threshold, a second signal threshold, and a third signal threshold. If the controller 106 determines that the audio signal does not fall below the first signal threshold, the controller 106 manages the first multiplexer 126, the second path selector 128 (e.g. second multiplexer), and the third path selector 130 to generate a first signal path such that the audio signal generated by the amplifier/attenuator 110 passes through and is processed by the first filter stage 112, the second filter stage 114, the S&H circuit 116, the SDM 118, and the DAC 120.

If the controller 106 determines that the audio signal falls below the first signal threshold, but not below the second signal threshold, the controller 106 manages the the first multiplexer 126, the second path selector 128 (e.g. second multiplexer) and the third path selector 130 to generates a second signal path such that an audio signal generated by the amplifier/attenuator 110 bypasses first filter stage 112. The audio signal generated by the amplifier/attenuator 110 passes through and is processed by the second filter stage 114 the S&H circuit 116, the SDM 118, and the DAC 120.

If the controller 106 determines that the audio signal falls below the second signal threshold, but not below the third signal threshold, the controller 106 manages the first multiplexer 126, the second path selector 128 (e.g. second multiplexer), and the third path selector 130 to generate a third signal path such that an audio signal generated by the amplifier/attenuator 110 bypasses first filter stage 112, the second filter stage 114 and the S&H circuit 116. The audio signal generated by the amplifier/attenuator 110 passes through and is processed by the SDM 118, and the DAC 120.

If the controller 106 determines that the audio signal falls below the third signal threshold, the controller 106 manages the first multiplexer 126, the second path selector 128 (e.g. second multiplexer), and the third path selector 130 to generate a fourth signal path such that an audio signal generated by the amplifier/attenuator 110 bypasses first filter stage 112, the second filter stage 114, the S&H circuit 116 and the SDM 118. The audio signal generated by the amplifier/attenuator 110 passes through and is processed by the DAC 120.

In an embodiment, the controller 106 enables the "zero" data input supplied by the third path selector 130 to an input of the second path selector 128 (e.g. second multiplexer) to generate the fourth signal path. In an embodiment, the first filter stage 112, the second filter stage 114, the S&H circuit 116, the SDM and the clock signal generator are all shut down when the controller 106 enables the "zero" data input to the second path selector 128.

The audio system 100 includes a clock signal generator (not shown). The clock signal generator is communicatively coupled to the controller 106, first filter stage 112, second filter stage 114, and/or other blocks/components of the audio system 100. The clock signal generator is configured to generate a timing signal that can be adjusted by the controller 106 to synchronize the operation of the different components of the audio system 100 under different operating conditions. For example, the components of the audio system 100 can by synchronized to a specific timing signal provided by the clock signal generator when the signal path includes the first filter stage 112. When the signal path is reconfigured to bypass the first filter stage 112 or the first and second filter stages 112, 114, the clock division(s) associated with the timing signal can be adjusted by the controller 106 to achieve processing rates for the different components of the audio system 100 to accommodate the alternations in the signal path from. In an embodiment, the clock signal generator is powered down when the controller enables the "zero" data input supplied by the third path selector 130 to an input of the second path selector 128 (e.g. second multiplexer) to generate the fourth signal path.

Figure 6:
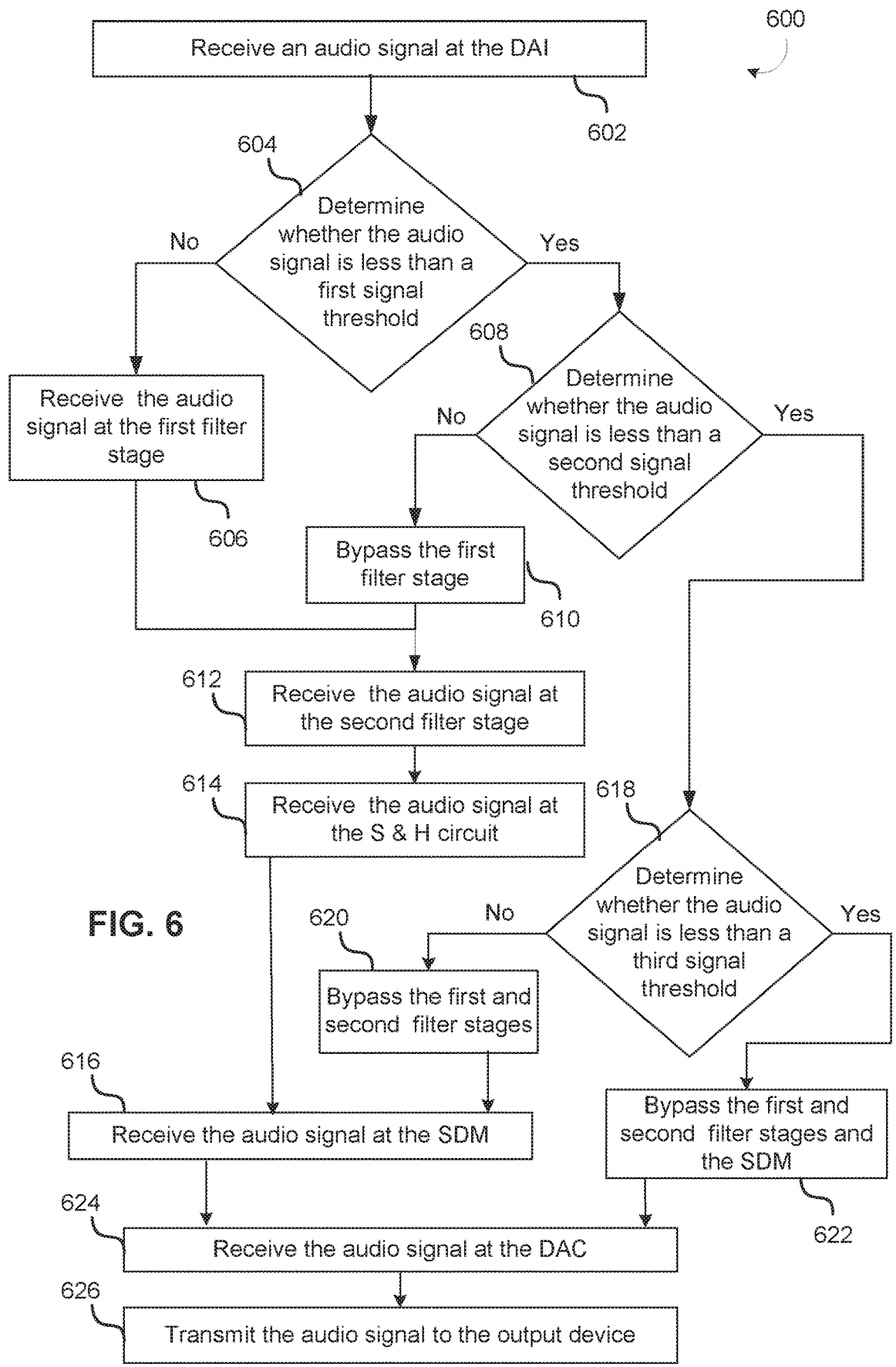
FIG. 6 is a flow diagram representation of an example of a method of selectively bypassing a first filter stage, a second filter stage, and a sigma-delta modulator in an embodiment of an audio system.

Referring to FIG. 6 a flow diagram representation of an example of a method 600 of selectively bypassing a first filter stage, a second filter stage, and a sigma-delta modulator in an embodiment of an audio system 100 is shown.

At 602, an audio signal is received at the DAI 108. The received audio signal is a digital audio signal. The controller 106 determines whether the audio signal received at the DAI 108 is less than a first signal threshold at 604. In an embodiment, the first signal threshold is a signal amplitude threshold. In an embodiment, the first signal threshold is a signal power threshold. In an embodiment, the first signal threshold is a predefined signal threshold. In an embodiment, the first signal threshold may be a dynamic signal threshold that is varies based on one or more operating parameters associated with the audio system 100 and/or factors that may impact the noise present in the received audio signal.

If the controller 106 determines that the audio signal is not less than the first signal threshold, the controller 106 generates a first signal path where the audio signal output by the amplifier/attenuator 110 is received at the first filter stage 112 for processing at 606. Following the processing of the audio signal by the first filter stage 112, the audio signal proceeds to the second filter stage 114 and the audio signal is received at the second filter stage 114 at 612. Following the processing of the audio signal by the second filter stage 114, the audio signal is received at the S&H circuit 116 at 614. The audio signal is the received from the S&H circuit at the SDM 118 for processing at 616. The audio signal is received at the DAC 120 from the SDM 118 for processing at 624 and then transmitted from the DAC 120 to the output device 104 at 626.

If the controller 106 determines that the audio signal is less than the first signal threshold at 604, the controller 106 determines whether the audio signal is less than the second signal threshold at 608. If the controller 106 determines that the audio signal is not less than the second signal threshold, the controller 106 determines a first attenuation factor associated with audio signals that fall below the first signal threshold but not below the second signal threshold. The controller 106 manages the operation of the amplifier/attenuator 110 to implement the attenuation of the received audio signal in accordance with the determined first attenuation factor.

The controller 106 generates a second signal path where the audio signal output by the amplifier/attenuator 110 bypasses the first filter stage 112 at 610 and proceeds to the second filter stage 114. The audio signal is received at the second filter stage at 612. Following the processing of the audio signal by the second filter stage 114, the audio signal is received at the S&H circuit 116 at 614. The audio signal is the received from the S&H circuit 116 at the SDM 118 for processing at 616. The audio signal is received at the DAC 120 from the SDM 118 for processing at 624 and then transmitted from the DAC 120 to the output device 104 at 626.

In an embodiment, the bypassed first filter stage 112 is disabled. In an embodiment, the bypassed first filter stage 112 is turned off. In an embodiment, the bypassed first filter stage 112 is deactivated. The controller 106 may reconfigure the clock signal generator to adjust the clocks signals generated by the clock signal generator to accommodate the processing of the audio signal via the second signal path.

If the controller 106 determines that the audio signal is less than the second signal threshold at 608, the controller 106 determines whether the audio signal is less than the third signal threshold at 618. If the controller 106 determines that the audio signal is not less than the third signal threshold, the controller 106 determines a second attenuation factor associated with audio signals that fall below the second signal threshold but not below the third signal threshold. The controller 106 manages the operation of the amplifier/attenuator 110 to implement the attenuation of the received audio signal in accordance with the determined second attenuation factor.

The controller 106 generates a third signal path where the audio signal output by the amplifier/attenuator 110 bypasses the first filter stage 112 and the second filter stage 114 at 620. The audio signal also bypasses the S&H circuit 116 and is received at the SDM 118 for processing at 616. The audio signal is received at the DAC 120 from the SDM 118 for processing at 624 and then transmitted from the DAC 120 to the output device 104 at 626.

In an embodiment, the bypassed second filter stage 114 is disabled. In an embodiment, the bypassed second filter stage 114 is turned off. In an embodiment, the bypassed second filter stage 112 is deactivated. The controller 106 may reconfigure the clock signal generator to adjust the clocks signals generated by the clock signal generator to accommodate the processing of the audio signal via the third signal path.

If the controller 106 determines that the audio signal is less than the third signal threshold, the controller 106 determines a third attenuation factor associated with audio signals that fall below the third signal threshold. The controller 106 manages the operation of the amplifier/attenuator 110 to implement the attenuation of the received audio signal in accordance with the determined third attenuation factor.

The controller 106 generates a fourth signal path where the audio signal output by the amplifier/attenuator 110 bypasses the first filter stage 112, the second filter stage 114, and the SDM 118 at 622. The audio signal also bypasses the S&H circuit 116. The audio signal is received at the DAC 120 from the amplifier/attenuator 110 for processing at 624 and then transmitted from the DAC 120 to the output device 104 at 626.

In an embodiment, the bypassed SDM 118 is disabled. In an embodiment, the bypassed SDM 118 is turned off. In an embodiment, the bypassed SDM 118 is deactivated. When the controller 106 generates the fourth signal path, the clock signal generator is also one of disabled, turned off, or deactivated. The steps described with respect to method 600 may be performed in a different order. The method 600 may include additional steps or fewer steps than those described above.

While a number of different embodiments of the first, second, and third path selectors have been disclosed, alternative combinations of hardware and/or software may be used to generate the first, second, third and/or fourth signal paths.

Figure 7:
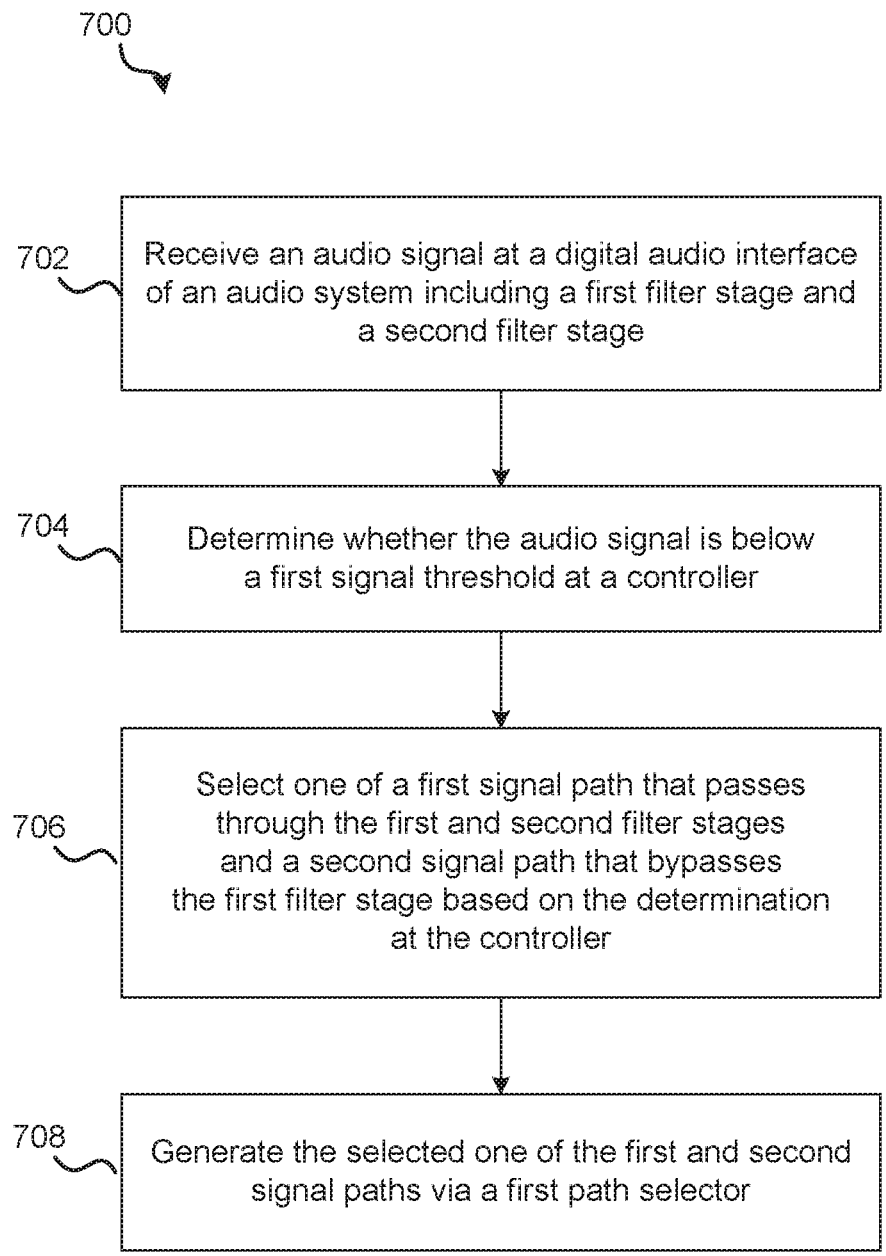
FIG. 7 is a flow diagram of an example of a method of processing an audio signal in an embodiment of an audio system.

FIG. 7 is a flow diagram of an example of a method 700 of processing an audio signal in an embodiment of an audio system 100. An audio signal is received at a digital audio interface 108 of an audio system 100 comprising a first filter stage 112 and a second filter stage 114 at 702. A determination is made regarding whether the audio signal is below a first signal threshold at a controller 106 at 704. One of a first path that passes through the first and second filter stages 112, 114 and a second path that bypasses the first filter stage 112 is selected by the controller 106 based upon the determination at 706. The selected one of the first and second paths is generated via a first path selector at 708. The steps described with respect to method 700 may be performed in a different order. The method 700 may include additional steps or fewer steps than those described above.

Figure 8:
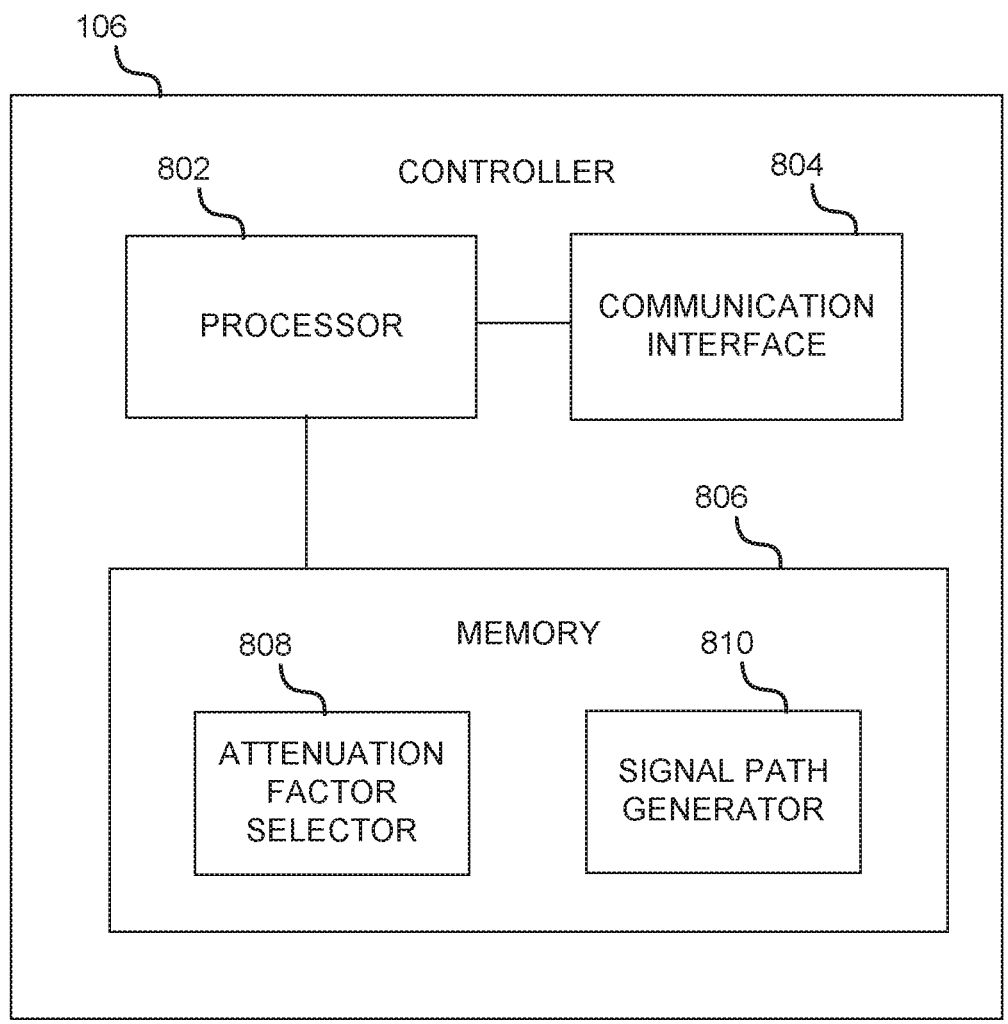
FIG. 8 is a block diagram representation of an embodiment of a controller for use in an embodiment of an audio system.

Referring to FIG. 8 a block diagram representation of an embodiment of a controller for use in an embodiment of an audio system is shown. The controller 106 includes a processor 802 communicatively coupled to a communication interface 804 and a memory 806. An attenuation factor selector 808 and a signal path generator 810 are stored in the memory 806. The attenuation factor selector enables the selection of the first, second and/or third attenuation factors described above. The signal path generator enables the selection of one of the first, second, third and/or fourth signal paths. In an embodiment, the controller 106 is an expander.

The processor 802 provides processing functionality for at least the audio system 100/controller 200 and can include any number of microprocessors, digital signal processors, micro-controllers, circuitry, field programmable gate array (FPGA) or other processing systems, and resident or external memory for storing data, executable code, and other information accessed or generated by the audio system 100/controller 106. The processor 802 can execute one or more software programs embodied in a non-transitory computer readable medium that implement techniques described herein. The processor 802 is not limited by the materials from which it is formed or the processing mechanisms employed therein and, as such, can be implemented via semiconductor(s) and/or transistors (e.g., using electronic integrated circuit (IC) components), and so forth.

The memory 806 can be an example of tangible, computer-readable storage medium that provides storage functionality to store various data and or program code associated with operation of the audio system 100/controller 106, such as software programs and/or code segments, or other data to instruct the processor 702, and possibly other components of the audio system 100/controller 106, to perform the functionality described herein. Thus, the memory 806 can store data, such as a program of instructions for operating the audio system 100 (including its components), and so forth. It should be noted that while a single memory 806 is described, a wide variety of types and combinations of memory (e.g., tangible, non-transitory memory) can be employed. The memory 806 can be integral with the processor 802, can comprise stand-alone memory, or can be a combination of both.

Some examples of the memory 806 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the audio system 100 and/or the memory 806 can include removable integrated circuit card (ICC) memory, such as memory provided by a subscriber identity module (SIM) card, a universal subscriber identity module (USIM) card, a universal integrated circuit card (UICC), and so on.

The communications interface 804 can be operatively configured to communicate with components of the audio system 100. For example, the communications interface 804 can be configured to transmit data for storage in the audio system 100, retrieve data from storage in the audio system 100, and so forth. The communications interface 804 can also be communicatively coupled with the processor 802 to facilitate data transfer between components of the audio system 100 and the processor 802 (e.g., for communicating inputs to the processor 802 received from a device (e.g., audio source 102) communicatively coupled with the audio system 100/controller 106, e.g., via DAI 108). It should be noted that while the communications interface 804 is described as a component of an audio system 100/controller 106, one or more components of the communications interface 804 can be implemented as external components communicatively coupled to the audio system 100 via a wired and/or wireless connection. The audio system 100 can also include and/or connect to one or more input/output (I/O) devices (e.g., via the communications interface 804), such as a display, a mouse, a touchpad, a touchscreen, a keyboard, a microphone (e.g., for voice commands) and so on.

The communications interface 804 and/or the processor 802 can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 206 can be configured to communicate with a single network or multiple networks across different access points. In a specific embodiment, a communications interface 206 can transmit information from the controller 200 to an external device (e.g., a cell phone, a computer connected to a WiFi network, cloud storage, etc.). In another specific embodiment, a communications interface 206 can receive information from an external device (e.g., a cell phone, a computer connected to a WiFi network, cloud storage, etc.).

In embodiments, the communications interface 804 is configured to receive audio from an audio source 102 (e.g., a mobile device (e.g., smartphone, tablet, smartwatch, activity tracker, digital camera, notebook computer, portable media player, portable gaming device, portable storage device, etc.), an audio receiver, a television, a personal computer, or the like). For example, the communications interface 804 can include DAI 102. The communications interface 206/DAI 102 may be configured to receive audio signals from the audio source 102 via a communicative coupling. The communicative coupling can include a wired coupling, a wireless coupling (e.g., WiFi, Bluetooth, or the like), an optical fiber coupling, or the like.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

In an example implementation, when the average signal level of a signal drops below a predefined threshold signal level (e.g. −85 dB), the controller 106 is configured to cause the amplifier/attenuator 110 to reduce the gain of the signal (to avoid audible change in the path and get the internal signal down towards zero) and then bypasses the filters (e.g., DSP core filters) in the first filter stage 112 to save power. This change also means the second filter stage 114 runs at a different input rate (e.g., one fourth (¼) of its usual rate), which may result in an additional power saving in the second filter stage 114 (e.g., about 25% of its normal power consumption). There may be additional power savings in clock trees of the audio system 100. For example, the second filter stage 114 clocks can switch at one fourth (¼) of the nominal rate for the audio system 100 and the first filter stage 112 clocks can be reduced to less than 10% of their original rate. The first and second filter stages 112, 114 are gated by the number of cycles being processed. Accordingly, a reduction in the amount of filtering performed by the first filter stage 112 and/or the second filter stage 114 can result in a reduced amount of switching. The passband of the system may differ due to increased droop from the second filter stage 114, but if the signal is low enough then this difference is not audible (i.e., not perceivable or minimally perceivable by the average listener). The aliasing of the signal can also be affected, but it may be so close to the noise floor that it may make little to no difference to an average listener.

When a signal with a high signal level is detected, the reverse can happen. Depending on the magnitude of the signal, different actions can be taken. For example, when the signal is only marginally above the "low signal level" threshold, the process can be reversed to ensure it is inaudible. For example, the controller 106 can be configured to switch the filters of the first filter stage 112 back on, control the control switch and possibly multiplexer(s) to switch back to original signal path configuration and then increase the system gain back to normal operating level. When a higher signal level is applied, the system may switch high performance filters back on. In some implementations, there can be some hysteresis such that the audio system 100 does not switch regularly for low input signals. In some implementations, when a large step signal is input, the audio system 100 can switch immediately and may employ psycho-acoustic masking to hide any switching artefacts. If the signal goes from silence (or near silence) to a very high signal level instantaneously (or near instantaneously), then the audio system 100 may reconfigure the filter and signal paths more quickly without trying to manage the transition. For example, the controller 106 can be configured to switch one or more bypassed and/or disabled filter stages back on when a signal level above a high threshold signal level is detected and may return the signal gain level to a nominal value at the same time (or substantially at the same time).

When the audio system 100 is operating in a low power state (e.g., signal level is below a predefined threshold signal level), it is not necessary to adhere to the stopband attenuation and passband ripple specifications of the audio system 100. For example, the signal level may be low enough that the deviation(s) from stopband attenuation and passband ripple specifications are not perceivable by an average listener. In such instances, the controller 106 may be configured to cause the control switch and multiplexer(s) (e.g., first and/or second multiplexer) to reconfigure the signal path in order to bypass all filters (e.g., first and second filter stages 112, 114) in the chain leaving only the SDM 118 running. In some implementations, the controller 106 is further configured to cause the control switch and multiplexer(s) (e.g., first and/or second multiplexer) to reconfigure the signal path to bypass all the filter stages as well as the SDM 118 (as previously discussed herein).

It is to be understood that the present application is defined by the appended claims. Although embodiments of the present application have been illustrated and described herein, it is apparent that various modifications may be made by those skilled in the art without departing from the scope and spirit of this disclosure.

What is claimed is:

1. An audio system comprising:
   a digital audio interface configured to receive an audio signal from an audio source, the audio signal having at least one of amplitude and power;
   a first filter stage and a second filter stage, the first filter stage and the second filter stage configured to filter an audio noise from the audio signal;
   a first path selector communicatively coupled to at least one of the first filter stage and the second filter stage, the first path selector configured to select between a first signal path that passes the audio signal through the first filter stage and a second signal path that causes the audio signal to bypass the first filter stage, the first path selector comprising a first multiplexer configured to select between the first signal path and the second signal path to furnish the audio signal to the second filter stage; and a controller communicatively coupled to the digital audio interface and the first path selector, the controller configured to:
compare at least one of the amplitude or the power of the audio signal to a respective one of a first signal amplitude threshold and a first signal power threshold, wherein
when the controller determines that the at least one of the amplitude or the power of the audio signal is above the respective one of the first signal amplitude threshold and the first signal power threshold, the controller causes the first multiplexer to select the first signal path, and
when the controller determines that the at least one of the amplitude or the power of the audio signal is below the respective one of the first signal amplitude threshold and the first signal power threshold, the controller causes the first multiplexer to select the second signal path.

2. The audio system of claim 1, further comprising
a second path selector communicatively coupled to the second filter stage, the second path selector configured to select between a fifth signal path that includes the first signal path and further passes an output of the first signal path through the second filter stage and a third signal path that causes the audio signal to bypass the first filter stage and the second filter stage, the second path selector comprising a second multiplexer configured to select between the fifth signal path and the third signal path;
and wherein the controller is further configured to:
compare at least one of the amplitude or the power of the audio signal to a respective one of a second signal amplitude threshold and a second signal power threshold, wherein
when the controller determines that the at least one of the amplitude or the power of the audio signal is above the respective one of the second signal amplitude threshold and the second signal power threshold, the controller causes the second multiplexer to select the fifth signal path, and
when the controller determines that the at least one of the amplitude or the power of the audio signal is below the respective one of the second signal amplitude threshold and the second signal power threshold, the controller causes the second multiplexer to select the third signal path.

3. The audio system of claim 2, comprising:
a sigma delta modulator; and
a third path selector communicatively coupled to the controller and the sigma delta modulator, the third path selector configured to select between a sixth signal path that includes the fifth signal path and further passes an output of the fifth signal path through the sigma delta modulator and a fourth signal path that causes the audio signal to bypass the first filter stage, the second filter stage, and the sigma delta modulator, the third path selector configured to supply a "zero" data to an input of the second path selector and select between the sixth signal path and the fourth signal path;
and wherein the controller is further configured to:
compare at least one of the amplitude or the power of the audio signal to a respective one of a third signal amplitude threshold and a third signal power threshold, wherein
when the controller determines that the at least one of the amplitude or the power of the audio signal is above the respective one of the third signal amplitude threshold and the third signal power threshold, the controller causes the first multiplexer, the second multiplexer and the third path selector to select the sixth signal path, and
when the controller determines that the at least one of the amplitude or the power of the audio signal is below the respective one of the third signal amplitude threshold and the third signal power threshold, the controller causes the first multiplexer, the second multiplexer and the third path selector to select to select the fourth signal path.

4. The audio system of claim 3, wherein the controller is further configured to:
determine an attenuation factor for the audio signal received at the digital audio interface based on a comparison of the audio signal with at least one of the first, second, and third signal amplitude thresholds, and
the audio system further comprises an attenuator communicatively coupled to the controller and the digital audio interface and the attenuator being configured to:
receive the audio signal received at the digital audio interface; and
attenuate the audio signal in accordance with the attenuation factor determined by the controller.

5. The audio system of claim 4, wherein the controller is further configured to:
compare at least one of the amplitude or the power of the audio signal to a respective one of the second signal amplitude threshold and the second signal power threshold, the second signal amplitude threshold being lower than the first signal amplitude threshold and the second signal power threshold being lower than the first signal power threshold, wherein
when the controller determines that the at least one of the amplitude or the power of the audio signal is above the respective one of the second signal amplitude threshold and the second signal power threshold, the controller causes the first multiplexer to select the first signal path, and
when the controller determines that the at least one of the amplitude or the power of the audio signal is below the respective one of the second signal amplitude threshold and the second signal power threshold, the controller causes the first multiplexer to select the third signal path.

6. The audio system of claim 5, wherein the audio system further comprises:
a third path selector communicatively coupled to the controller, the second filter stage, and the sigma delta modulator,
wherein the controller is further configured to compare at least one of the amplitude or the power of the audio signal to a respective one of the third signal amplitude threshold and the third signal power threshold, the third signal amplitude threshold being lower than the second signal amplitude threshold and the third signal power threshold being lower than the second signal power threshold, wherein when the controller determines that the at least one of the amplitude or the power of the audio signal is above the respective one of the third signal amplitude threshold and the third signal power threshold, the controller causes the first multiplexer to select the first signal path, the second multiplexer to select the fifth signal path, and the third path selector to select the sixth signal path, and when the controller determines that the at least one of the amplitude or the power of the audio signal is below the respective one of the third signal amplitude threshold and the third signal power threshold, the controller causes the first multiplexer to select the second signal path, the second multiplexer to select the third signal path and the third path selector to select the fourth signal path.

7. The audio system of claim 1, wherein one of the first and second filter stages comprises at least one digital signal processing (DSP) core filter.

8. The audio system of claim 1, wherein one of the first and second filter stages comprise at least one first infinite impulse response (IIR) filter.

9. The audio system of claim 1, wherein one of the first and second filter stages comprises a cascaded integrator-comb (CIC) filter.

10. The audio system of claim 1, wherein the controller comprises an expander.

11. A method for processing an audio signal comprising:
receiving an audio signal from an audio source, the audio signal having at least one of amplitude and power, at a digital audio interface of an audio system comprising a first filter stage and a second filter stage, the first filter stage and the second filter stage configured to filter a noise from the audio signal;
selecting between a first signal path that passes the audio signal through the first filter stage and a second signal path that causes the audio signal to bypass the first filter stage at a first path selector communicatively coupled to at least one of the first filter stage and the second filter stage, the first path selector comprising a first multiplexer configured to select between the first signal path and the second signal path to furnish the audio signal to the second filter stage;
comparing at least one of the amplitude or the power of the audio signal at a controller communicatively coupled to the digital audio interface and the first path selector to a respective one of a first signal amplitude threshold and a first signal power threshold;
selecting the first signal path when the controller determines that the at least one of the amplitude or the power of the audio signal is above the respective one of the first signal amplitude threshold and the first signal power threshold; and
selecting the second signal path when the controller determines that the at least one of the amplitude or the power of the audio signal is above the respective one of the first signal amplitude threshold and the first signal power threshold.

12. The method of claim 11, wherein the method further comprises:
determining an attenuation factor for the audio signal received at the digital audio interface based on a comparison of the audio signal with at least the first signal amplitude threshold; and
attenuating the audio signal received at the digital audio interface in accordance with the determined attenuation factor at an attenuator.

13. The method of claim 11, further comprising:
selecting between a fifth signal path that includes the first signal path and further passes an output of the first signal path through the second filter stage and a third signal path that causes the audio signal to bypass the first filter stage and the second filter stage at a second path selector communicatively coupled to the second filter stage, the second path selector comprising a second multiplexer configured to select between the fifth signal path and the third signal path;
comparing at least one of the amplitude or the power of the audio signal at the controller to a respective one of a second signal amplitude threshold and a second signal power threshold, the second signal amplitude threshold being lower than the first signal amplitude threshold, and the second signal power threshold being lower than the first signal power threshold;
selecting the fifth signal path when the controller determines that the at least one of the amplitude or the power of the audio signal is above the respective one of the second signal amplitude threshold and the second signal power threshold; and
selecting the third signal path when the controller determines that the at least one of the amplitude or the power of the audio signal is below the respective one of the second signal amplitude threshold and the second signal power threshold.

14. The method of claim 13, further comprising:
selecting between a sixth signal path that includes the fifth signal path and further passes an output of the fifth signal path through a sigma delta modulator and a fourth signal path that causes the audio signal to bypass the first filter stage, the second filter stage, and the sigma delta modulator at a third path selector communicatively coupled to the controller and the sigma delta modulator, the third path selector configured to supply a "zero" data to an input of the second path selector and select between the sixth signal path and the fourth signal path;
comparing at least one of the amplitude or the power of the audio signal at the controller to a respective one of a third signal amplitude threshold and a third signal power threshold, the third signal amplitude threshold being lower than the second signal amplitude threshold, and the third signal power threshold being lower than the second signal power threshold;
selecting the sixth signal path when the controller determines that the at least one of the amplitude or the power of the audio signal is above the respective one of the third signal amplitude threshold and the third signal power threshold; and
selecting the fourth signal path when the controller determines that the at least one of the amplitude or the power of the audio signal is below the respective one of the third signal amplitude threshold and the third signal power threshold.

15. The method of claim 13, wherein one of the first and second filter stages comprises at least one digital signal processing (DSP) core filter.

16. The method of claim 13, wherein one of the first and second filter stages comprise at least one first an infinite impulse response (IIR) filter.

17. The method of claim 13, wherein one of the first and second filter stages comprises a cascaded integrator-comb (CIC) filter.

18. An audio system comprising:
a digital audio interface configured to receive an audio signal from an audio source, the audio signal having at least one of amplitude and power;
a first filter stage and a second filter stage, the first filter stage and the second filter stage configured to filter an audio noise from the audio signal;
at least one path selector communicatively coupled to at least one of the first filter stage and the second filter stage, the at least one path selector configured to select between a first signal path that passes the audio signal through the first filter stage and the second filter stage, a second signal path that causes the audio signal to bypass the first filter stage and pass through the second filter stage, and a third signal path that bypasses the first filter stage and the second filter stage, the at least one path selector comprising at least one multiplexer configured to select the first signal path, the second signal path, or the third signal path;
a controller communicatively coupled to the digital audio interface, the controller configured to:
compare at least one of the amplitude or the power of the audio signal to a respective one of a first signal amplitude threshold, a second signal amplitude threshold, a first signal power threshold, and a second signal power threshold, the second signal amplitude threshold and the second signal power threshold being lower than the first signal amplitude threshold and the first signal power threshold respectively and wherein
when the controller determines that the at least one of the amplitude or the power of the audio signal is above the respective one of the first signal amplitude threshold and the first signal power threshold, the controller causes the at least one multiplexer to select the first signal path,
when the controller determines that the at least one of the amplitude or the power of the audio signal is below the respective one of the first signal amplitude threshold and the first signal power threshold and above the second signal amplitude threshold and the second signal power threshold, the controller causes the at least one multiplexer to select the second signal path,
when the controller determines that the at least one of the amplitude or the power of the audio signal is below the respective one of the second signal amplitude threshold and the second signal power threshold, the controller causes the at least one multiplexer to select the third signal path.

19. The audio system of claim 18, wherein the at least one path selector is configured to:
select between a fifth signal path that includes the first signal path and further passes an output of the first signal path through a sigma delta modulator, and a fourth signal path that bypasses the first filter stage, the second filter stage, and the sigma delta modulator, the at least one path selector comprising the at least one multiplexer configured to select one of the fifth signal path, and the fourth signal path; and
wherein the controller is further configured to:
compare at least one of the amplitude or the power of the audio signal to a respective one of a third signal amplitude threshold, and a third signal power threshold, the third signal amplitude threshold and the third signal power threshold being lower than the second signal amplitude threshold and the second signal power threshold respectively and wherein
when the controller determines that the at least one of the amplitude or the power of the audio signal is above the respective one of the third signal amplitude threshold and the third signal power threshold, the controller causes the at least one multiplexer to select the fifth signal path,
when the controller determines that the at least one of the amplitude or the power of the audio signal is below the respective one of the third signal amplitude threshold and the third signal power threshold, the controller causes the at least one multiplexer to select the fourth signal path.

20. The audio system of claim 18, wherein the controller is further configured to:
determine an attenuation factor for the audio signal received at the digital audio interface based on a comparison of the audio signal with at least one of the first and second signal amplitude thresholds, and the audio system further comprises an attenuator communicatively coupled to the controller and the digital audio interface and the attenuator being configured to:
receive the audio signal received at the digital audio interface; and
attenuate the audio signal in accordance with the attenuation factor determined by the controller,
a first path selector communicatively coupled to the controller and at least one of the first filter stage and the second filter stage, the first path selector being configured to generate the selected one of the first and second signal paths.

* * * * *